May 9, 1967  G. G. DOWNING  3,318,563
CONCRETE BLOCK MOLD ASSEMBLY
Filed July 8, 1964  5 Sheets-Sheet 1

INVENTOR.
George G. Downing
BY

May 9, 1967  G. G. DOWNING  3,318,563
CONCRETE BLOCK MOLD ASSEMBLY
Filed July 8, 1964  5 Sheets-Sheet 2
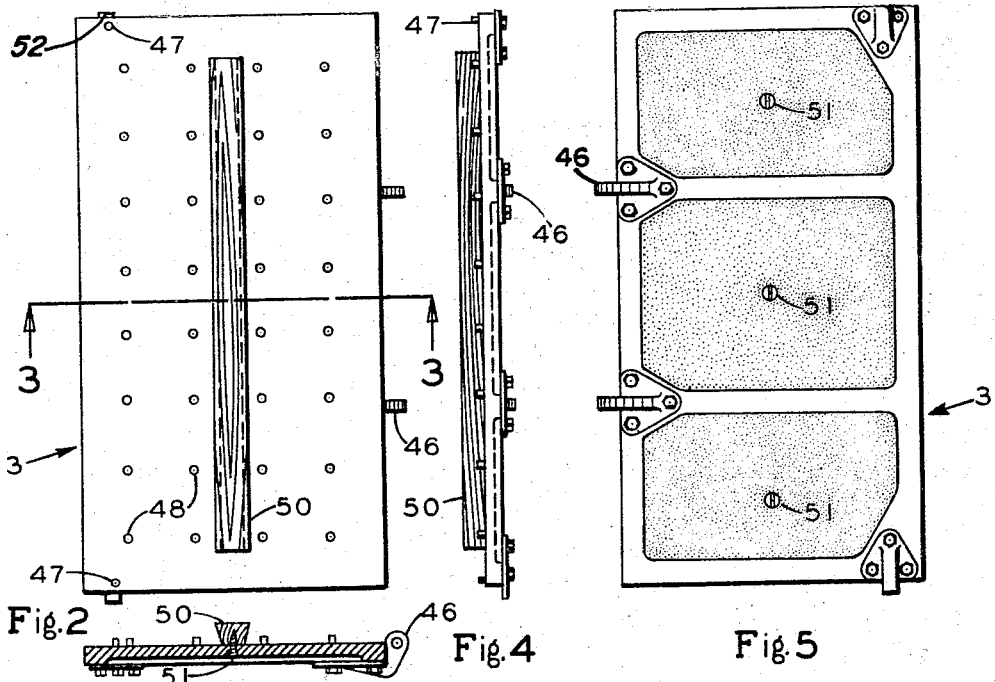
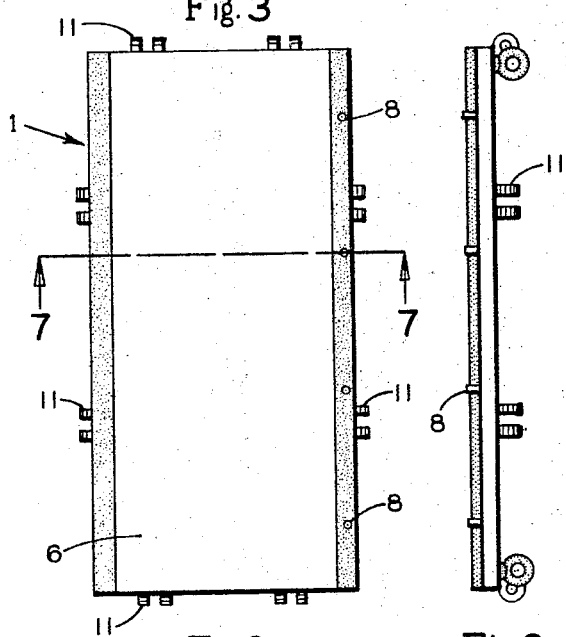
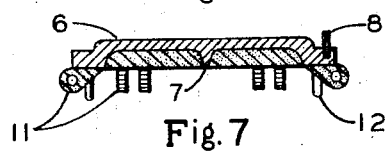
INVENTOR.
George G. Downing
BY May 9, 1967 G. G. DOWNING 3,318,563
CONCRETE BLOCK MOLD ASSEMBLY
Filed July 8, 1964 5 Sheets-Sheet 3

INVENTOR.
George G. Downing
BY

May 9, 1967   G. G. DOWNING   3,318,563
CONCRETE BLOCK MOLD ASSEMBLY
Filed July 8, 1964   5 Sheets-Sheet 5

*INVENTOR.*
George G. Downing

United States Patent Office 3,318,563
Patented May 9, 1967

3,318,563
CONCRETE BLOCK MOLD ASSEMBLY
George G. Downing, Palo Alto, Calif.
(9019 Riderwood Drive, Sunland, Calif. 91040)
Filed July 8, 1964, Ser. No. 381,061
12 Claims. (Cl. 249—140)

This invention relates to the manufacture of concrete blocks and more particularly to a mold assembly for manufacturing such blocks.

The building construction industry has long recognized the need for an improved concrete building block and many proposals have been made for providing such blocks. One reason why concrete blocks are not already in wider use is the problem of manufacturing the blocks and in particular the more sophisticated types of blocks having numerous cast-in features such as service conduits, facing designs, nailing strips, plastering recesses, mortar receiving grooves, and bores for the reception on alignment and rigidifying rods.

Accordingly, it is an object of the invention to provide an improved concrete block mold assembly for making sophisticated concrete blocks of the type described.

More specifically, an object of the invention is to provide a mold for casting large concrete building blocks with large diameter horizontal lightening holes which may also serve as conduits for air conditioning or for service piping and wiring. A related object of the invention is to provide a mold assembly including cores for forming said lightening holes in a manner whereby the cores are easily removable from the formed block.

An additional object of the invention is to provide a concrete block mold assembly which includes means for casting alignment tubes into the block for the purpose of achieving simple and precise positioning of the building blocks during use of such blocks in construction.

Another object of the invention is to provide a concrete block mold assembly which will permit forming on one surface of the block a special layer, for example a dense waterproof face which will have a simulated brick or stone design in any desired color.

A further object of the invention is to provide a concrete block mold assembly which will form blocks having cast-in mortar grooves in the top and end surfaces of the finished blocks so that the patterned front faces of the blocks will be in direct abutment and will not be separated by the mortar joining adjacent blocks.

An additional object of the invention is to provide a concrete block mold assembly which will form a block having a cast-in wooden or plastic nailing strip in the back face of the block to permit the easy attachment of wall paneling.

Another object of the invention is to provide a concrete block mold assembly which will provide a block having cast-in plaster recesses in the back face of the block to facilitate application of wet plaster to the inside walls of a structure made with such building blocks.

An additional object of the invention is to provide an improved core assembly for use with concrete block molds.

Another object of the invention is to provide a method of using a concrete block mold assembly.

Other and further objects and features of advantage will be apparent to those skilled in the art from the following detailed description wherein reference is made to the accompanying drawings in which:

FIG. 2 is a plan view of the inside surface of the back plate shown removed from the remainder of the assembly;

FIG. 3 is a cross sectional view of the back plate taken on the line 3—3 of FIG. 2;

FIG. 4 is an edge view of the back plate taken from the right of FIG. 2;

FIG. 5 is a plan view of the outside surface of the back plate;

FIG. 6 is a top view of the base plate with the remainder of the assembly removed;

FIG. 7 is a cross sectional view of the base plate taken on the line 7—7 of FIG. 6;

FIG. 8 is an edge view of the base plate looking from the right in FIG. 6;

FIG. 9 is a plan view of the outside surface of the base plate;

Figure 1:
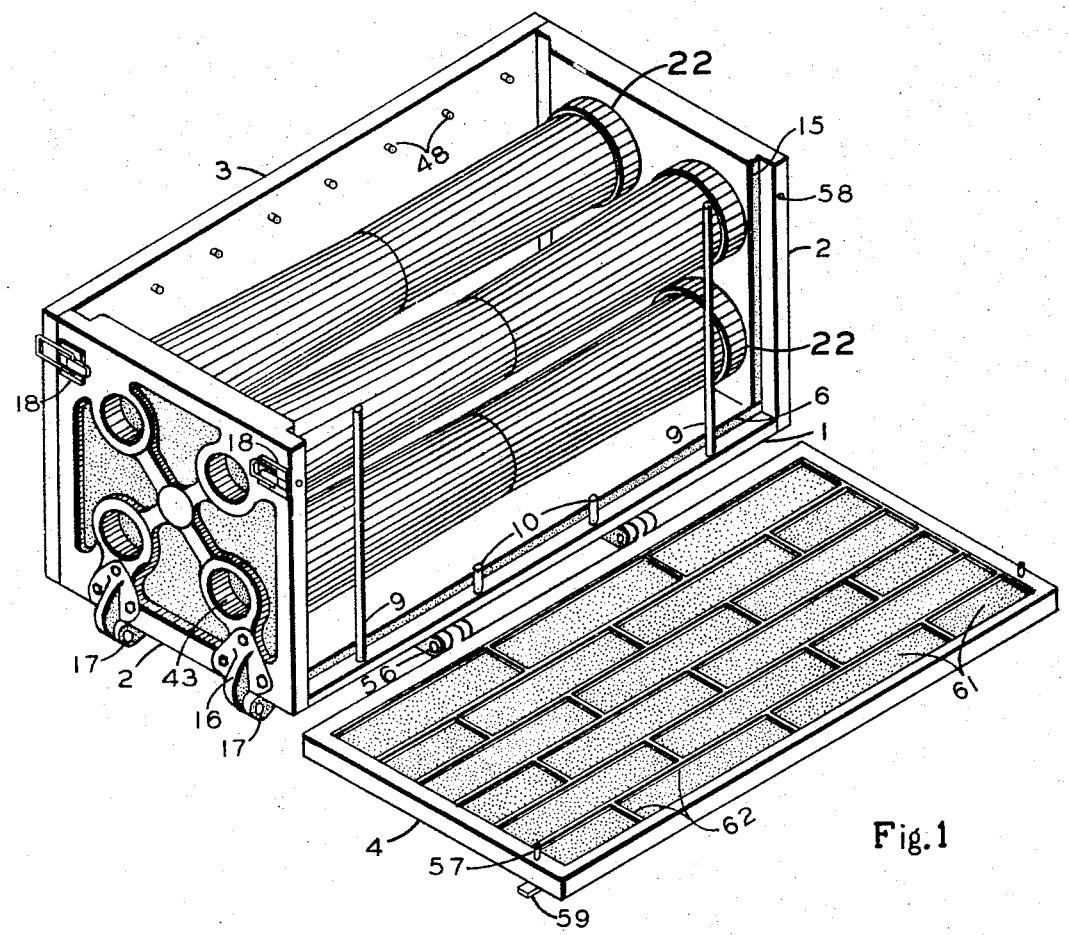
FIG. 1 is a perspective view of the mold assembly with the face plate in the horizontal position ready for pouring into the recessed surface of the face plate the material which will form the patterned face of the completed block.
Figure 10:
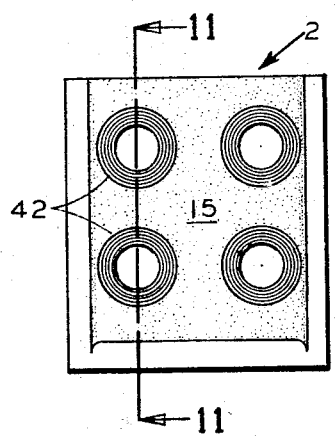
FIG. 10 is a plan view of the inside surface of one of the end plates removed from the assembly and prior to the attachment of the connecting hinges and latches.
Figure 11:
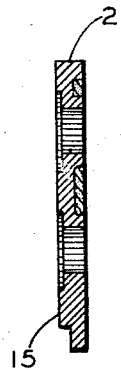
FIG. 11 is a cross sectional view of FIG. 10 taken on the line 11—11.
Figure 12:
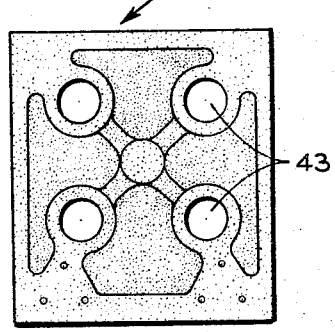
FIG. 12 is a plan view of the outside surface of one of the end plates in the condition shown in FIG. 10.
Figure 13:
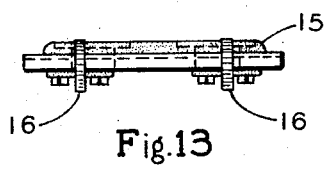
FIG. 13 is an edge view of one of the end plates with the connecting hinges and latches in position.
Figure 14:
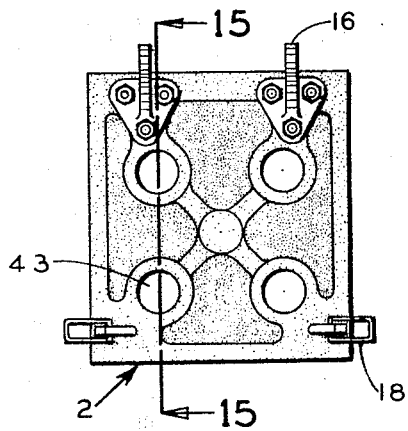
FIG. 14 is a plan view of the outside surface of one of the end plates with the connecting hinges and latches in place.
Figure 15:
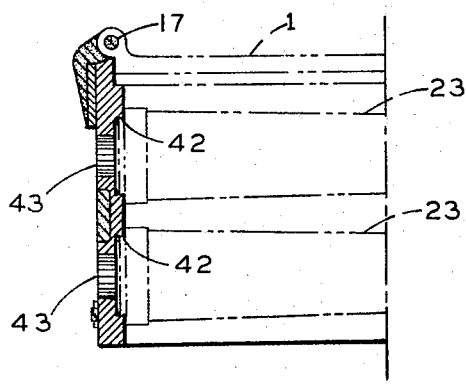
FIG. 15 is a cross sectional view taken on the line 15—15 of FIG. 14 and showing associated parts in dot-dash lines.
Figure 16:
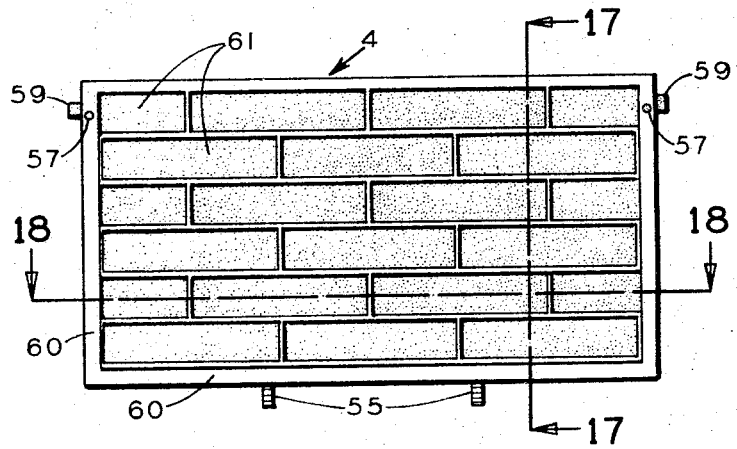
FIG. 16 is a plan view of the inside surface of the face plate removed from the assembly.
Figure 17:
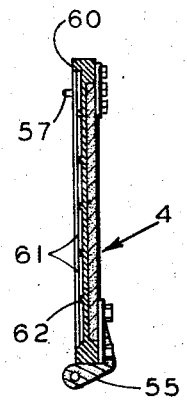
FIG. 17 is a cross sectional view taken on the line 17—17 of FIG. 16.
Figure 18:
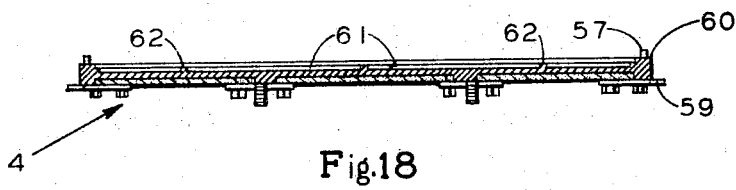
FIG. 18 is an edge view of the face plate taken from the bottom of FIG. 16.
Figure 19:
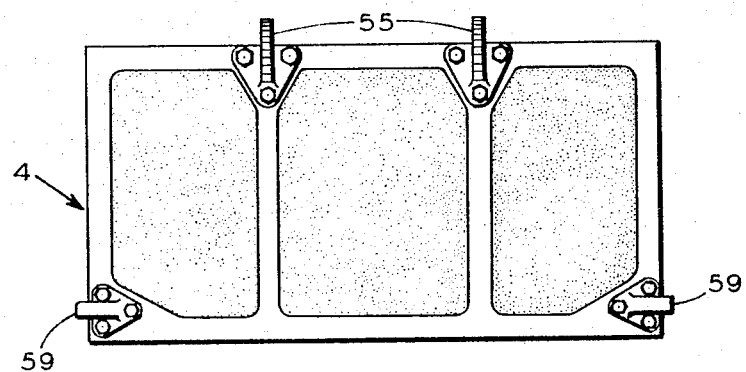
FIG. 19 is a plan view of the outside surface of the face plate.
Figures 20, 21:
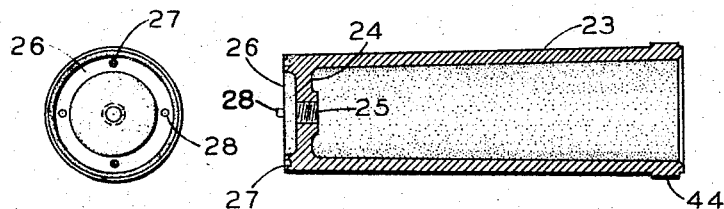
FIG. 20 is a cross sectional view of one of the hollow truncated cones which form the core assembly in the mold shown in FIG. 1.
FIG. 21 is a view of the small diameter end of the truncated cone of FIG. 20.
Figure 22:
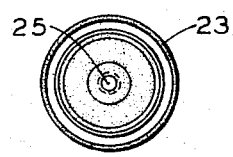
FIG. 22 is a view of the large diameter end of the truncated cone of FIG. 20.
Figure 23:
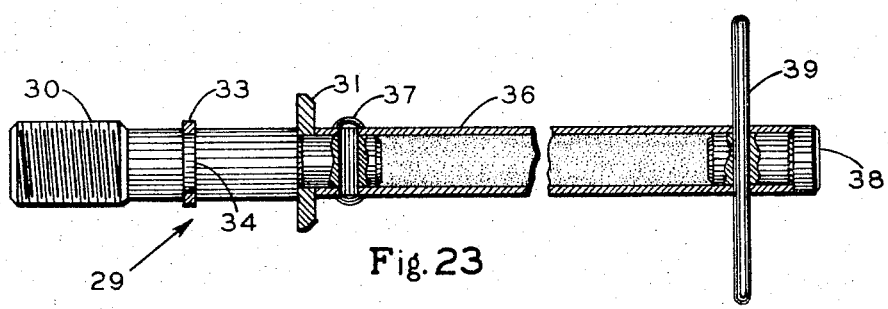
FIG. 23 is a view on enlarged scale partly in elevation and partly in section showing the tie-bolt for connecting the two truncated cones of each core assembly.

Referring in more detail to the drawings, FIG. 1 shows a mold assembly comprising a base plate 1, a pair of end plates 2, a back face plate 3 and a front face plate 4.

The details of the base plate are shown in FIGS. 6–9. More specifically, the base plate comprises a raised longitudinal center portion 6 on its inside surface and a reinforcing rib 7 on its outside surface. The purpose of the raised longitudinal center portion is to provide a wide mortar-receiving groove in what will be the top of a finished concrete block made in the mold assembly. The base plate further comprises four upright positioning pins 8 located adjacent the raised center portion as shown in FIGS. 6–8. The purpose of these pins is to locate and hold two long locating tubes 9 and two short locating tubes 10. Thus, the locating tubes will be cast into the finished block formed in the mold assembly. The locating tubes provide bores into which locating pins can be passed to assure perfect vertical alignment and lateral offset of the finished blocks relative to each other as they are being built into a wall, even with unskilled labor.

It should be understood that the length of the pins 8 and the length of the short tubes 10 is substantially the same so that the short tubes do not fill with concrete when the block is poured. Similarly, it will be understood that the long tubes 9 extend to the top of the mold assembly so that concrete is not poured into them.

The base plate further comprises two clevis hinge parts 11 along each edge for connection to each of the four side plates. Four steel eye bolts 12 are secured to the undersurface of the base plate. The eye bolts are preferably arranged adjacent the four corners of the base plate and the eye bolts at one end are arranged in line with those at the other end along lines parallel to the center line of the base plate.

In addition, each of the eye bolts is rotationally oriented so that the plane of each bolt is also in a line parallel to the center line of the base plate. In this way the eye bolts cannot only be used for lifting the mold assembly but can serve to guide the movement of the assembly when the assembly is placed with base plate down on a travelling member such as a belt with the eye bolts extending over the sides of the belt and riding in channel-shaped guides. The reason for consideration of transporting the mold assembly is that it is contemplated that it will be carried on a travelling member from the various operational stations such as the concrete filling station, the vibrating station and the removal station. The base plate is preferably made of cast aluminum as is each of the other plates.

The end plates 2 are shown in detail in FIGS. 10–15. Each of the end plates includes a raised longitudinal center portion 15 having substantially the same width and forming an upright continuation of the raised center portion 6 on the base plate. Thus, each concrete block made with the mold assembly will have a mortar groove on each end as well as on the top. The bottom of each end plate has attached thereto two hinge eye members 16 which fit with the hinge members 11 on the base plate and are pivotally attached thereto by hinge pins 17. In addition, each of the end plates has attached thereto a trunk latch member 18 for use in locking the end plates and face plates together.

The interior of the mold assembly contains a number of core members 22, preferably four as indicated in the drawings. All of the core assemblies are identical in construction and the details of one of them is shown in FIGS. 20–24. Each core assembly 22 comprises two hollow truncated cones 23, each preferably made of cast aluminum. Each of the cones is preferably identical for simplicity of manufacture and is provided with a closure wall 24 at its small diameter end. Each of the walls 24 is provided with a threaded bore 25. Each small end is shaped to provide an annular sealing face 26 shaped perpendicular to the axis of the core.

A plurality of alignment bores 27 are formed in the sealing face 26 and receive alignment pins 28 when two of the cones 23 are joined together. In order to hold each pair of cones 23 together while cement is being poured into the mold assembly, a tie-bolt 29 is provided, and is preferably made of stainless steel.

Figure 24:
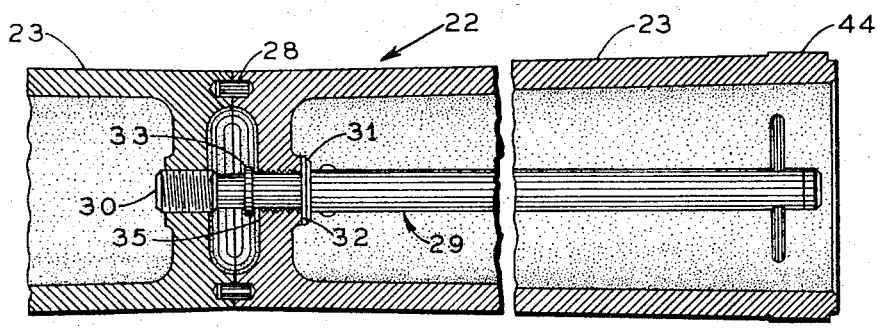
FIG. 24 is a cross sectional view on enlarged scale showing portions of two truncated cones as assembled by the tie-bolt of FIG. 23.

The tie-bolt has a threaded end 30 which can be threaded through one core 23 and into the next adjacent core as shown in FIG. 24. The tie-bolt includes a washer 31 which forms an abutment shoulder that engages an inner bearing face 32 formed around the inside end of bore 25. After the tie-bolt 29 has been threaded through one of the cores 23 and moved to the position where shoulder 31 engages bearing face 32, a split ring 33 is snapped into a groove 34 on the tie-bolt. Thus, the ring 33 forms a shoulder which can bear against an outer bearing face 35 formed around the outer end of bore 25. The tie-bolt is extended toward the large end of the core 23 by a tube 36 which is attached to the end of the tie-bolt by a rivet 37. The outer end of the tube is closed with a plug 38, and a cross pin 39 is positioned through the tube and plug to provide means for turning the tie-bolt.

Thus, in order to assemble two of the cores 23, the tie-bolt 29 is threaded through the bore 25 of one core 23 and is moved axially until the shoulder 31 engages the bearing face 32. Next the split ring 33 it attached. Then with the alignment pins 28 in place a second core 23 is positioned end to end with the first core and the tie-bolt 29 is rotated so that its end 30 is threaded into the bore 25 in the second core, compressing the cores together and holding them firmly aligned.

The large diameter end of each core is open so that the cross pin 39 of the tie-bolt can be easily reached to rotate the tie-bolt. Each of the two-core assemblies is held in position in the mold assembly by fitting the large diameter end of each core assembly into a recessed socket 42 in the adjacent end plate 2, as shown best in FIG. 15. The end plates are also provided with apertures 43 adjacent each of the recesses 42.

The large ends of the cores 23 are preferably provided with constant diameter collars 44 to provide for the reception of junction sleeves when two blocks are joined end to end. Such collars will extend part way into each of the abutting blocks and will prevent mortar in the mortar grooves from entering the conduits formed by the core assemblies. After a concrete block has been poured in the mold assembly around the core assemblies, the block is allowed to set before it is removed from the mold, as will be hereinafter described in more detail, and then the removal of the core assemblies is simply a matter of turning the tie-bolt to unscrew the portion 30 from the bore 25 in which it is threaded.

As will be understood from FIG. 24 such motion forces the washer 33 against the bearing face 35, and continued unscrewing rotation of tie-bolt 29 will force the adjacent cores 23 apart. In view of the tapered shape of the cores, it is then simply a matter of withdrawing them from the concrete block to leave spaces which form lightening holes and conduits for various services.

The back plate 3 as shown in detail in FIGS. 2–5 comprises a pair of hinge eye members 46 which fit with the hinge members 11 in the base plate to pivotally attach the back plate to the base plate. In addition the back plate carries two locating pins 47 which are received in appropriate bores in the edges of the end plates 2 so that the vertical position of the end plates is accurately established and rigidly maintained.

The inside surface of the back plate is also provided with a series of additional pins or other projections 48 spaced across substantially the entire surface of the back plate. The projections 48 will form recesses on the inside surface of a finished concrete block to facilitate adding a plaster coating to the inside surface of a wall formed with blocks made according to the invention. In order to increase the utility of blocks made according to the invention, a wedge shaped nailing strip 50 is held against the inner surface of the back plate 3 by screws 51 which are removed after a concrete block is poured in the mold assembly so that the nailing strip remains in the block. The nailing strip is preferably made of wood or plastic material. In order to hold the rear plate 3 attached to the end plates the rear plate is provided with two projections 52 which are engaged by the latches 18 on the end plates.

As shown in FIGS. 16–19 the face plate 4 comprises a pair of hinge eyes 55 which fit with the hinge members 11 on the base plate and are held in place by pins 56. The face plate is provided with inwardly projecting locating pins 57 which fit into bores 58 in the edges of the end plates 2 as shown in FIG. 1. In addition the face plate is provided with projections 59 which are engaged by the latches 18 on the end plates.

The face plate 4 has a raised peripheral rim 60, three sides of which abut the edges of the base plate and end plates. Within the peripheral rim 60 the inside surface of the base plate is recessed in a pattern or design. In the specific embodiment shown in the drawings the pattern comprises rectangular recesses 61 which will form the appearance of the faces of bricks in a finished concrete block.

The recesses 61 are separated by ribs 62 arranged to form in the finished block the appearance of conventional mortar joints in a brick wall. It will be understood from the preceding description that all of the side plates are pivotally connected to the base plate so that they can be adjusted between horizontal and vertical positions. This arrangement is particularly important in connection with the face plate and more specifically in connection with the recess in the inside surface of the face plate. Thus, when it is desired to make a concrete block with the mold assembly, the assembly is first arranged as shown in FIG. 1 with the end plates and back plate in the vertical position and the front plate in the horizontal position.

The recess in the inside surface of the front plate is filled with one type of material to the surface of the annular rim 60. The type of material used is preferably a dense waterproofed and colored Portland cement, which is then compacted by vibration and permitted to partially set. When the material has become sufficiently firm that it will not flow out of the front plate when the front plate is raised to the vertical position, the front plate is swung upwardly into abutment with the end plates where it is precisely aligned by the pins 57 and is locked into place by the latches 18. The mold is then filled with a low density concrete composed of a lightweight aggregate and compacted by vibration. The building block is levelled off with the mold by hand troweling and is allowed to set.

When the concrete is set in the mold it is inverted still in the mold onto a flat pallet and the mold is then ready to be removed from the block. The screws 51 are removed from the nailing strip 50 and then the front and back face plates are unlatched from the end plates and swung clear of the concrete block as are the end plates. The mold may then be lifted from the block by the eye bolts 12 and cleaned preparatory to refilling. Finally the four core assemblies are removed from the block by unscrewing the tie-bolts 29 as previously explained.

Although specific details of the present invention are shown and described herein, it is to be understood that modifications may be made therein without departing from the spirit and scope of the invention as set forth in the appended claims.

What is claimed is:

1. A concrete block mold assembly comprising:
   a base plate including a raised longitudinal center portion whose width is greater than one-half the width of said base plate and whose exposed surface is substantially planar;
   a pair of end plates hingedly connected to opposite end edges of said base plate and movable between a horizontal and an upright position, each of said end plates having a raised center portion substantially coextensive with and forming an upright continuation with the raised center portion of said base plate and a core receiving opening within said raised center portion;
   a front face plate and a back face plate hingedly connected to opposite side edges said base plate and movable between a horizontal and an upright position;
   locking means associated with adjacent edges of said end and face plates to secure the same to each other when in the upright position and to thereby form a rigid substantially rectangular open mold; and
   at least one hollow core assembly supported at opposite ends by said pair of end plates, each end of said core assembly having an end face positioned flush against the inner surface of the supporting end plate and a boss depending outwardly from said end face for reception in said core engaging opening.

2. A concrete block mold assembly comprising:
   a base plate including a raised longitudinal center portion whose width is at least one-half of the width of said base plate and whose surface is substantially planar;
   a pair of end plates hingedly connected for forming a corner butt with opposite end edges of said base plate and movable between a horizontal and an upright position, each of said end plates having a raised center portion substantially coextensive with and forming an upright continuation with the raised center portion of said base plate;
   a front face plate and a back face plate hingedly connected for forming a corner butt with opposite outer edges of said base plate and movable between a horizontal and an upright position; and
   locking means associated with adjacent edges of said end and face plates to secure the same to each other when in the upright position and to thereby form a rigid substantially rectangular open mold.

3. A concrete block mold assembly comprising:
   a base plate, a pair of end plates, a front plate, and a back plate, all of said plates being connected together to form an open top mold; and
   at least one hollow core assembly supported at opposite ends by two of said plates and including means disposed within the hollow core space to effect a separation of said core assembly into separate core portions, and each end of said core assembly having an end face sealed flush against the interior surface of the adjacent supporting plate.

4. A concrete block mold assembly as claimed in claim 3 in which said core assembly comprises a pair of hollow truncated cones axially aligned one with the other and having their small diameter ends positioned toward the center of the mold.

5. A concrete block mold assembly as claimed in claim 4 in which said core assembly further comprises means inside said truncated cones for holding said cones together and operable from the end of one of said cones for forcing said cones apart.

6. A concrete block mold assembly comprising:
   a base plate including a raised longitudinal center portion;
   a pair of end plates connected to opposite end edges of said base plate and having a raised center portion substantially coextensive with and forming an upright continuation with the raised center portion of said base plate;
   a front plate and a back plate connected to opposite side edges of said base plate; and
   a plurality of upright positioning pins on said base plate adjacent said raised longitudinal center portion; and having a width which is at least one-half of the width of said base plate;
   locating tubes fitted over said positioning pins.

7. A concrete block mold assembly comprising:
   a base plate including a raised longitudinal center portion having a width which is at least one-half of the width of said base plate;
   a pair of end plates hingedly connected to opposite end edges of said base plate and having a raised center portion substantially coextensive with and forming an upright continuation with the raised center portion of said base plate;
   a front face plate and a back face plate hingedly connected to opposite side edges of said base plate;
   locking means associated with adjacent edges of said end and face plates to secure the same to each other when in the upright position and to thereby form a rigid substantially rectangular open mold; and
   said front plate having an ornamental design in relief on its inner surface.

8. A concrete block mold assembly comprising:
a base plate including a raised longitudinal center portion;
a pair of end plates hingedly connected to opposite end edges of said base plate and having a raised center portion substantially coextensive with and forming an upright continuation with the raised center portion of said base plate;
a front plate and a back plate hingedly connected to opposite side edges of said base plate;
locking means associated with adjacent edges of said end and said face plates to secure the same to each other when in the upright position and to thereby form a rigid substantially rectangular open mold;
a plurality of positioning pins projecting upwardly from said base plate adjacent said raised longitudinal center portion;
locating tubes fitted over said positioning pins;
a plurality of projections extending inwardly from said back plate and spaced apart along substantially the entire surface of said back plate; and
a pattern formed on the inside surface of said front plate.

9. A concrete block mold assembly comprising:
a base plate including a raised longitudinal center portion;
a pair of end plates hingedly connected to opposite end edges of said base plate and having a raised center portion substantially coextensive with and forming an upright continuation with the raised center portion of said base plate;
a front face plate and a back face plate hingedly connected to opposite side edges of said base plate;
locking means associated with adjacent edges of said end and said face plates to secure the same to each other when in the upright position and to thereby form a rigid substantially rectangular open mold;
a plurality of positioning pins projecting upwardly from said base plate adjacent said raised longitudinal center portion;
locating tubes fitted over said positioning pins;
a plurality of projections extending inwardly from said back plate and spaced apart along substantially the entire surface of said back plate;
a pattern formed on the inside of said front plate; and
at least one core assembly supported at its opposite ends by said pair of end plates, said core assembly being separable from said end plates when said end plates are pivoted downwardly about their hinged connections to said base plate.

10. A concrete block mold assembly comprising:
a base plate including a raised longitudinal center portion;
a pair of end plates hingedly connected to opposite end edges of said base plate and having a raised center portion substantially coextensive with and forming an upright continuation with the raised center portion of said base plate;
a front face plate and a back face plate hingedly connected to opposite side edges of said base plate;
locking means associated with adjacent edges of said end and said face plates to secure the same to each other when in the upright position and to thereby form a rigid substantially rectangular open mold;
a plurality of positioning pins projecting upwardly from said base plate adjacent said raised longitudinal center portion;
a plurality of projections extending inwardly from said back plate and spaced apart along substantially the entire surface of said back plate;
a pattern formed on the inside surface of said front plate; and
at least one core assembly supported at opposite ends by said pair of end plates, said core assembly comprising a pair of truncated cones arranged coaxially with their small diameter ends adjacent each other and means releasably connecting the small diameter ends of said cones to each other.

11. A concrete block mold assembly comprising:
a base plate and a plurality of upright plates attached around the edges of said base plate to form an open top mold;
at least one positioning pin extending inwardly from the inside surface of one of said plates, and a locating tube fitted over said positioning pin.

12. A concrete block mold assembly comprising:
a base plate and a plurality of upright side plates connected together to form an open top mold;
a plurality of positioning pins extending upwardly from the inside surface of said base plate, a long tube fitted over one of said pins, and a short tube fitted over another of said pins, said long tube extending to the top of said open top mold, and said short tube being no longer than the pin over which it is fitted.

References Cited by the Examiner

UNITED STATES PATENTS

| | | | |
|---|---|---|---|
| 753,303 | 3/1904 | Park | 249—140 |
| 940,935 | 11/1909 | Larsen | 249—85 |
| 1,106,042 | 7/1914 | Gumm | 249—151 |
| 1,131,840 | 3/1915 | Hutn | 249—140 X |
| 1,448,236 | 3/1923 | Riney | 25—131 |
| 1,905,897 | 4/1933 | Cahill | 249—172 |
| 2,524,744 | 10/1950 | Zevely | 249—176 |
| 2,537,684 | 1/1951 | Manuel | 249—140 |

WILLIAM J. STEPHENSON, *Primary Examiner.*

J. SPENCER OVERHOLSER, *Examiner.*

E. MAR, *Assistant Examiner.*